(12) United States Patent
Slomka et al.

(10) Patent No.: US 11,429,598 B2
(45) Date of Patent: *Aug. 30, 2022

(54) TAG MANAGEMENT SYSTEM

(71) Applicant: Palantir Technologies Inc., Denver, CO (US)

(72) Inventors: Daniel Slomka, Washington, DC (US); Robert Fidler, Hoboken, NJ (US); Tarrek Shaban, Washington, DC (US); Eliana Schleifer, New York, NY (US); Michael Levin, Washington, DC (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,420

(22) Filed: Apr. 19, 2021

(65) Prior Publication Data

US 2021/0311932 A1    Oct. 7, 2021

Related U.S. Application Data

(63) Continuation of application No. 16/594,520, filed on Oct. 7, 2019, now Pat. No. 11,010,371.

(Continued)

(51) Int. Cl.
| | |
|---|---|
| G06F 40/134 | (2020.01) |
| G06F 16/23 | (2019.01) |
| G06F 16/25 | (2019.01) |
| G06F 3/04842 | (2022.01) |
| G06F 40/106 | (2020.01) |
| G06F 40/117 | (2020.01) |

(52) U.S. Cl.
CPC ...... *G06F 16/2379* (2019.01); *G06F 3/04842* (2013.01); *G06F 16/252* (2019.01); *G06F 40/106* (2020.01); *G06F 40/117* (2020.01); *G06F 40/134* (2020.01)

(58) Field of Classification Search
CPC ... G06F 40/134; G06F 40/117; G06F 3/04842
See application file for complete search history.

(56) References Cited

U.S. PATENT DOCUMENTS

| 9,898,167 B2 * | 2/2018 | Sun ........................ G06F 16/907 |
| 10,809,888 B2 * | 10/2020 | Sun ........................ G06F 16/907 |

(Continued)

*Primary Examiner* — Shen Shiau
(74) *Attorney, Agent, or Firm* — Knobbe, Martens, Olson & Bear, LLP

(57) ABSTRACT

A data resolution system provides users with the ability to access and create associations between data items tagged in documents as part of an initial process of identifying data items to be tagged in the documents. Thus, the user that is adding tags to the documents is able to identify related data items from other data sources and create links with those data sources. This ability to identify links at the time of tagging reduces the need for later searching of data sources for related data items. Additionally, the system automatically stores information regarding each link so that information regarding the linked data items may be viewed alongside the original document and/or further information regarding the linked data item is easily accessible. Data items that are tagged in a document may be associated with data items representing the same object, but with different identifiers, names, etc. in external data sources.

16 Claims, 11 Drawing Sheets

Related U.S. Application Data

(60) Provisional application No. 62/900,950, filed on Sep. 16, 2019.

(56) References Cited

U.S. PATENT DOCUMENTS

| | | | |
|---|---|---|---|
| 11,010,371 B1* | 5/2021 | Slomka | G06F 16/252 |
| 11,093,690 B1* | 8/2021 | Lee | G06F 16/93 |
| 2007/0028171 A1* | 2/2007 | MacLaurin | G06F 16/686 |
| | | | 715/825 |
| 2009/0217149 A1* | 8/2009 | Kamien | G06F 16/48 |
| | | | 715/764 |
| 2014/0129959 A1* | 5/2014 | Battles | G06Q 30/0251 |
| | | | 715/765 |
| 2018/0239826 A1* | 8/2018 | Epstein | G06F 40/143 |
| 2019/0034441 A1* | 1/2019 | Capon | G06F 40/143 |
| 2020/0364294 A1* | 11/2020 | Brown | G06F 40/284 |
| 2021/0026510 A1* | 1/2021 | Sun | G06F 3/0484 |
| 2021/0311932 A1* | 10/2021 | Slomka | G06F 16/252 |

\* cited by examiner

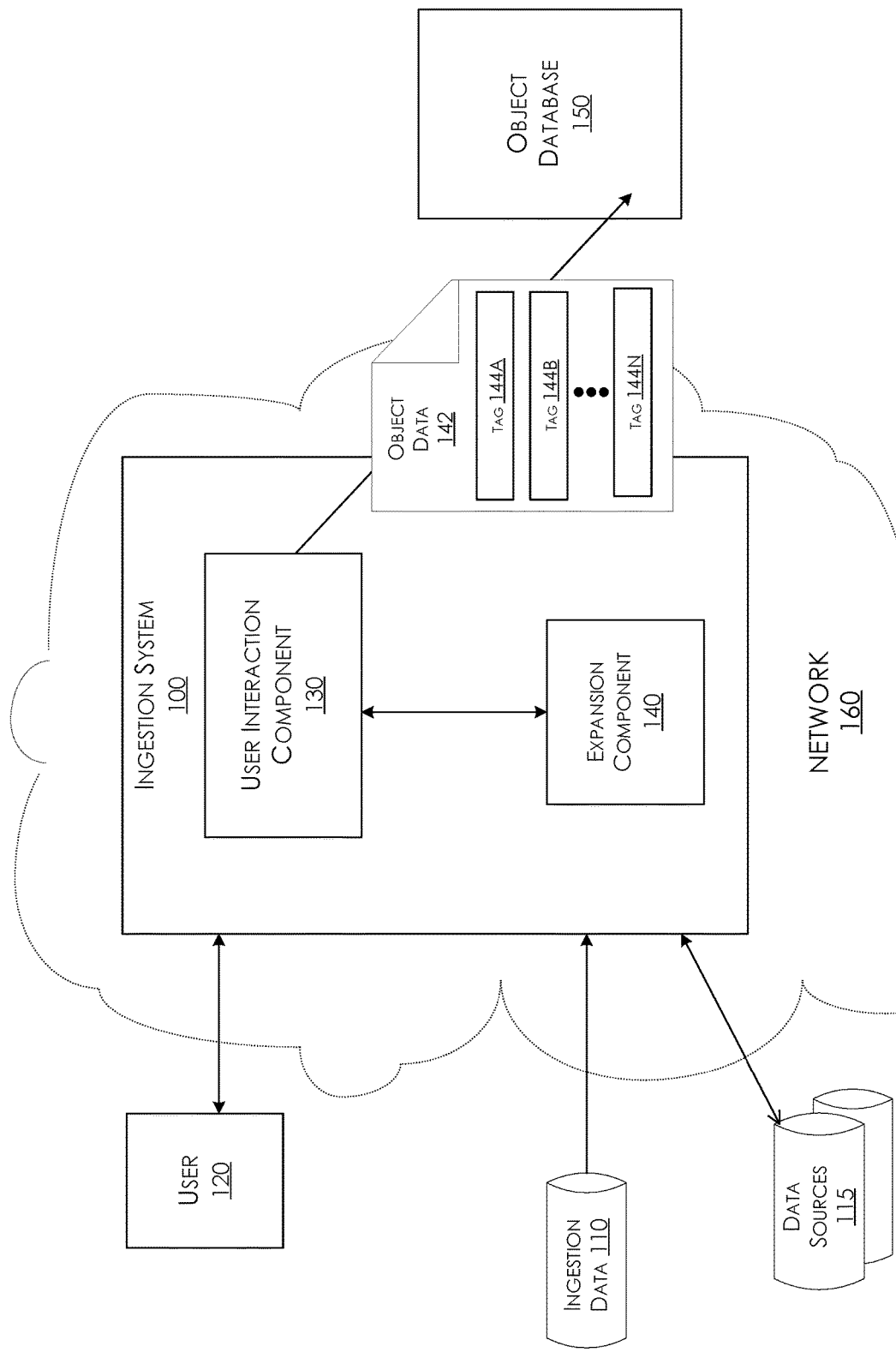

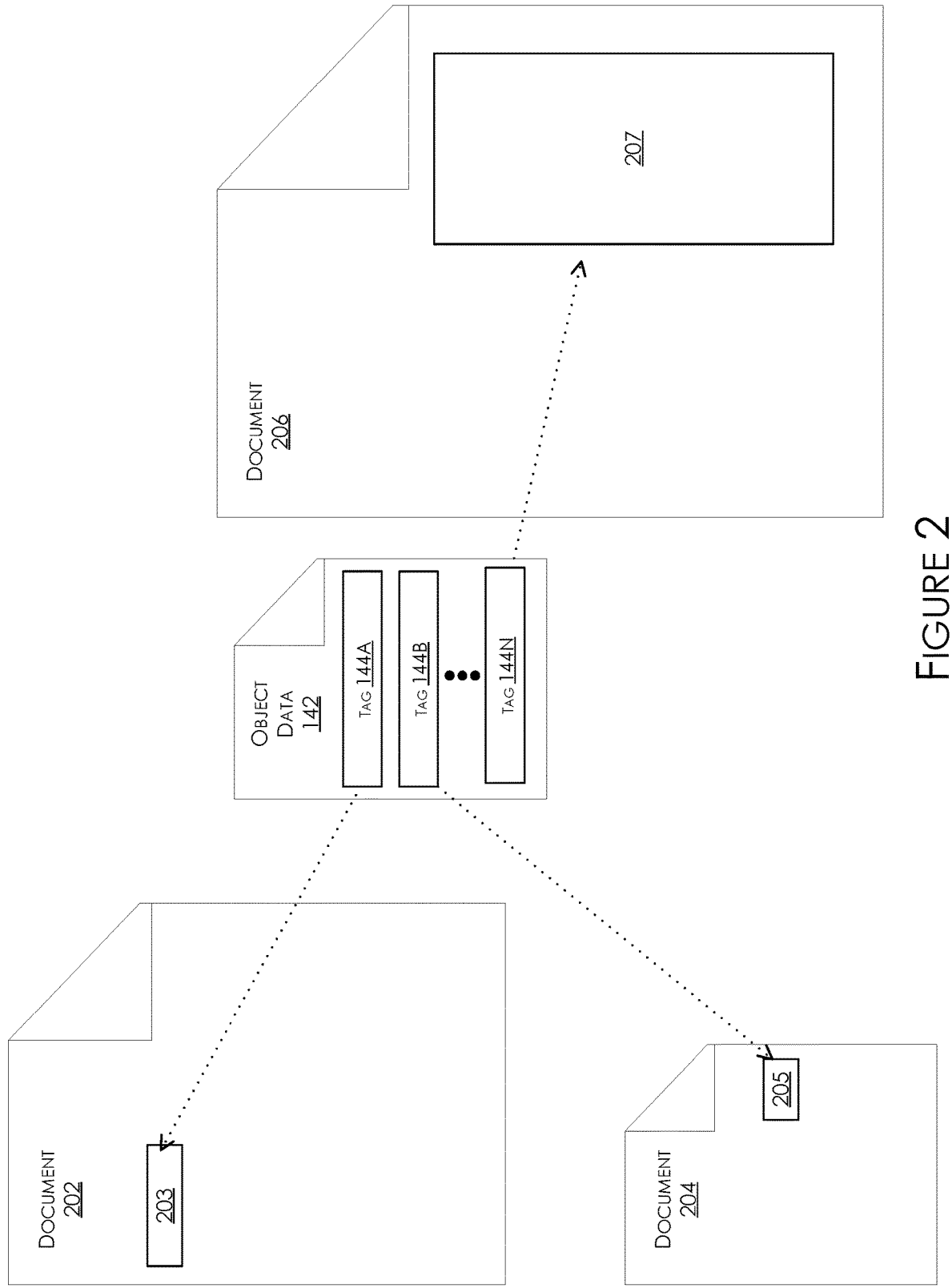

Compound Overview Document

Known Issues

Overview  Properties

Document Tagging — 310

Table of Organic Impurities — 320

| Common Name | CAS Number | Impurity Type | Structure |
|---|---|---|---|
| Cyclofenil Diphenol (USP Impurity A) | 5189-40-2 | Process Impurity | Xx—⬡—⬡—Xx (structure) |
| USP Impurity B | 886587-59-3 | Degradant Impurity | (structure with Xx) |

— 330

Process to Ensure Compliance with Identification Criteria

Lobortis scelerisque feriesntem dui faucibes in ernare qusm viverrs. Pretium nibh ipsum conscqual nisl vel pretium lectus. Egeslas integer egct aliquet nibh precsent tristique. Viverra msuris in aliquam sem fringills ut morbi. Nulla faciisi morbi tempus isculis urna id volutpat lacus. Tristique sollicitudin nibh sit amet commodo nulla faciiisi. Mauris sit amct massa vitae tortor condimentunm lacinia quis vel.Morbi non arcu risus quis varius. Turpis egecitas integer egct aliqucl nibh pracsent tristiqus magna sit. Msocenss pharctra convallis posucre morbi. Ullamcorpor dignissim cras tincidunt loborties. In hendrerit gravida rutrum quisque. Viverra orci sagittis cu volutpat odio facilisis mauris sit amet. Semper auctor neque vitae tempus quam Pellenesque. Aliquam faucibus purus in massa temper.

Tagged objects

☒ USP Impurity B — 332
  Impurity

FIGURE 3

Choose impurity     400

☑ Only show impurities linked to | CO22231

🔍 Search...

showing 1 of 1

| ☒ USP Impurity B<br>Impurity | ☒ USP Impurity B<br>Impurity |
|---|---|

Derived Limit    Impurity Type
100.0 PPM    DEGREDENT
Limit    Unit
No value    PPM

📄 1 Compound Overview
⑂ 1 Ingredient

Confirm

⊕ Create new impurity

FIGURE 4A

Create impurity     450

🔗 This new Impurity will be automatically linked to    📄 CO22231

Given Name

Limit

Unit
🔍 Search... ✕

Impurity Type
🔍 Search... ✕

Status
◉ Approved
○ Not Approved

Substance ID
Fjkl3434-345sdgh-36664hr-421234g

Submit

FIGURE 4B

Source Documents

Compound Overview Document — 510

Bob Jones - 4 minute ago
UNII
345sdgh-36664hr-421234g
Approved - [true]
Impurity Type - [DEGREDENT]
Impurity Name - [USP Impurity B]

Specifications — 520

Bob Jones - 1 minutes ago
Unit - [PPM]
Derived Limit - [100 PPM]
Limit - [100]

---

3.2.P.5.1 - Specifications

Lorem ipsum dolor sit amet, consectctur adipiseing elit, sed do ciusmod tempor incididunt at Labore et dolore magna aliqua. At auctor urna nunc id curvus metus. Pracsent tristique magna sit amet purus gravida quis blandit. Pretium aemean pharctra magna ac placeral vestibulum. Pellentesque habitant morbi tristique sencetus. Facilisis gravida neque convallis a cras. Sit amet arcu odio ut sem nulla. Id volutpal lacus laorect non cerabitur gravida arcu ac. Massa id ncque aliquam vestibulum morbi blandit. Sed velit dignissim sodales ut cu sem.

Tortor condimentum lacinia quis vel cros donec ac. Cursus in hac habitasse platea dictumst quisque sagittis purus sit. Diam sotticitudin tempor id eu nisl nine. Turpis egestas pretium acnean pharetra magna ac placerat vestibulum. In cu mi bibendum neque. Vitae et lco duis ut diam quam nullaporttitor massa. Faucibus turpis in cu mi bibendum neque egestas congue. Nascetur ridiculus mus mauris vitae ultricies. Nee tincidunt pracsent semper feugiat nibh sed pulvinar proin. Laoreet suspendisse interdum consectetur libero id faucibus. Risus nee feugiat in fermentum posuere urna nee tincidunt praesent. Odio ut sem nulla pharetra. Auctor clit sed vulputate mi sit amet mauris. Gravida rutrum quisque non tellus orci ac auctor augue mauris. Et malcsuada fames ac turpis egestas maccenss pharetra. Pharetra massa massa ultricies mi quis. Vel orci porta non pulvinar neque.

Organic Impurities

| Impurity Name | Release Limit |
|---|---|
| Cyclofenil Diphenol | 0.5 % |
| 4-Hydraxy Cyclofenil Diphenol | 100 PPM |

Tempus urna ct pharetra pharetra massa massa ultricies mi. Velit scelerisque in dictum non consectetur a crat nam at. Tempor commodo ullamcorper a lacus vestibulum sed. In dictum non consectetur a crat nam at. Vel cusm elementum pulvinar etiam non. Vivamus arcu felis

FIGURE 5

TAG MANAGEMENT SYSTEM

TECHNICAL FIELD

The present disclosure relates to automatic identification of information related to tagged items in a document.

BACKGROUND

Documents that are ingested into a data management system may be analyzed and a user may associate tags with certain portions of the documents. In some applications, items within a document (e.g., that represent a particular person, object, or other data item) may be related to other data objects, such as within one or more external data sources. Thus, a user may access documents from the one or more external databases and identify a related data object therein, such as through multiple searches for matching properties, and then note a relationship between the tagged data item and the related data object in an external database, such as in a spreadsheet or database. This process may be repeated for multiple data sources as the user reviews data objects in those external databases to identify related objects. This process of identifying related objects is cumbersome and prone to errors.

SUMMARY

A data resolution system provides users with the ability to access and create associations between data items tagged in documents as part of an initial process of identifing data items to be tagged in the documents. Thus, the user that is adding tags to the documents is able to identify related data items from other data sources and create links with those data sources. This ability to identify links at the time of tagging reduces the need for later searching of data sources for related data items. Additionally, the system automatically stores information regarding each link so that information regarding the linked data item(s) may be viewed alongside the original document and/or further information regarding the linked data item may be easily accessed. Data items that are tagged in a document may be associated with data items representing the same object, but with different identifiers, names, etc. in external data sources. Dashboards may be created and customized to include information regarding tags (including related data items associated with the tags), such as summaries of tags, links to external data sources from which the tags were sourced, analysis of tags associated with a document, and the like.

Documents that are ingested into a data management system may include various types of information, such as in various graphic elements (e.g., photographs, charts, tables, logos, drawing elements, handwriting, scanned text), as well as computer readable content, such as text, markup code, hyperlinks, fields, etc. Associations between documents that have some overlapping content allows both human and computer resources to minimize when information is later accessed in the documents. For example, a document may include information regarding a particular data item, such as a particular automobile, grocery store, sporting equipment, microorganism, etc. for which additional information is available in one or more other data sources. For example, when a document describing maintenance work performed on a particular automobile is ingested into a data management system (for example, an invoice for maintenance work is scanned and stored in a document management system), identifying related data items and including those in meta-data associated with document advantageously conserves computer processing requirements when multiple users later access the maintenance work document and individually use computer resources in an attempt to identify the related data items. Thus, as described herein, a document ingestion system allows a user, such as a user that manages ingestion of a certain type of documents for an organization, to easily identify related data items and to establish associations with the related data items. For example, upon scanning an automobile maintenance work order, the document ingestion system may automatically identify any particular make and model of automobile identified in the work order and search for external data sources regarding that make and model of automobile. Similarly, the document ingestion system may automatically identify a repair procedure identified in the scanned maintenance work order and automatically search for external data sources that may include information regarding that specific repair procedure. Accordingly, as the ingestion specialist reviews the maintenance work order document, information from these additional data sources may be displayed, such as in a side-by-side view with a portion of the maintenance work order document, so that the ingestion specialist can select relevant portions of those data sources (e.g., data items in documents) to be associated with the maintenance work order document. Accordingly, when a user later accesses that maintenance work order document, the relationships with the external data itemts (e.g., at external data sources) is identified by the system and the tagged data items may be automatically displayed to the user.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) *User Interface Design*. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In an example implementation, a computerized method, performed by a computing system having one or more hardware computer processors and one or more non-transitory computer readable storage device storing software instructions executable by the computing system to perform the computerized method comprises providing a user interface displaying at least a portion of a document; receiving selection from a user of a text or graphic portion of the document including a data item; receiving selection of a tag to be associated with the data item of the document; determining a data source having additional information associated with the data item; identifying in the data source the additional information associated with the data item; displaying at least a portion of the additional information in the user interface; receiving selection of a related data item in the additional information; and creating a relationship between the related data item and the tag in metadata associated with the document.

In some implementations, the data source is automatically determined based on a type of the data item. In some implementations, the additional information is of the type of the data item. In some implementations, the method further comprises creating a second tag associated with the related data item, the second tag identifying the data source. In some implementations, the metadata associated with the document comprises a document object having properties identifying the tag and the second tag. In some implementations, the user interface includes at least a portion of data item associated with the tag and at least a portion of the related data item associated with the second tag. In some implementations, the at least a portion of the related data item includes a selectable link to the data source. In some implementations, selection of the selectable link causes the user interface to be updated at least a portion of the data source. In some implementations, the user interface concurrently includes at least a portion of the document, the data item associated with the tag, and the related data item associated with the second tag. In some implementations, the method further comprises receiving from the user an indication of one or more properties of the data item, wherein said determining a data source having additional information associated with the data item is based at least partly on the one or more properties of the data item. In some implementations, the one or more properties of the data item include one or more of a name, an identifier, or characteristic of the data item. In some implementations, the metadata further includes indications of when the data item was tagged and when the related data item was tagged.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 1 is a block diagram illustrating one embodiment of an ingestion system in communication with various other systems and components.

FIG. 2 a conceptual block diagram illustrating the object data, such as may be associated with a particular data item of an ingested document, and associations with multiple tags within the ingested document and multiple external documents.

FIG. 3 is an example user interface illustrating a view of an ingested document that allows a user to create tags in the ingested document, as well as initiate lookup of potentially related documents and other information for creating related tags.

FIG. 4A illustrates an extraction pane that allows selection of related information to be associated with a tagged data item.

FIG. 4B illustrates a user interface that may be displayed for creation of a new data object for a tagged portion of a document.

FIG. 5 is an example user interface that may be displayed to allow the user to cycle through tags associated with an ingested document and with the corresponding tagged data items within the ingested document and/or other source documents.

DETAILED DESCRIPTION

Terms

Figure 4C:
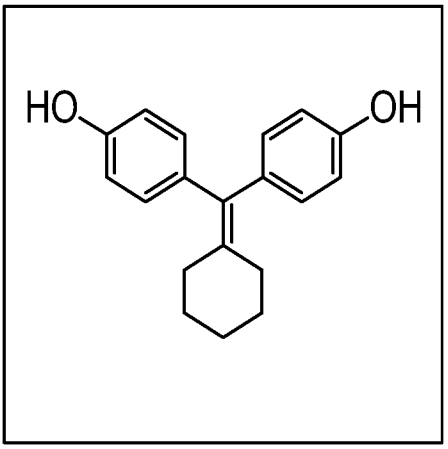
FIG. 4C illustrates a user interface that may be displayed in response to user selection of an option to link a data item with another tagged data item.

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms, wherein such construction is consistent with context of the term. Thus, the descriptions below do not limit the meaning of these terms, but only provide example descriptions.

Data Object, Object, Data Item, or Item: A data container for information representing specific things in the world that have a number of definable properties. For example, a data object can represent an asset, a person, a place, an organization, a market instrument, a biological substance, a chemical compound, or other noun. A data object can represent an event that happens at a point in time or for a duration. A data object can represent a document or a portion of a document, such as a portion of text of a document and/or a portion of graphical content within a document. A data object can represent unstructured data, such as an e-mail message, a news report, or a written paper or article. Each data object may be associated with a unique identifier that uniquely identifies the data object. The object's attributes (e.g., metadata about the object) may be represented in one or more properties.

Object Type: Type of a data object (e.g., asset, person, event, or document). Object types may be defined by an ontology and may be modified or updated to include additional object types. An object definition (e.g., in an ontology) may include how the object is related to other objects, such as being a sub-object type of another object type (e.g., agent may be a sub-object type of a person object type), and the properties the object type may have.

Properties: Attributes of a data object that represent individual characteristics, attributes, or qualities of the data object. Properties typically include a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Application Programming Interfaces (APIs): an API is generally a defined communication channel, protocol, settings, etc. that allows two devices to exchange information between one another in a more direct manner than might otherwise be possible. In some embodiments, an API registration module may be configured to register individual devices (e.g. computing devices, Internet of things devices, sensors, etc.) for communication with a particular computing device (e.g., a central server that receives, processes, stores, provides, information to the individual devices) by issuing a token to the individual devices that authorizes such direct communications. Thus, a computing system may establish secure and direct communication channels with multiple devices via APIs.

Ontology: Stored information that provides a data model for storage of data in one or more data structures, such as databases. For example, the stored information may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

FIG. 1 is a block diagram illustrating one embodiment of an ingestion system 100 in communication with various other systems and components. In this example, the ingestion system 100 is configured to access data of various formats, such as image-based and text documents, and to coordinate tagging of portions of the data. In the example of FIG. 1, the ingestion system 100 includes a user interface component 130 and an expansion component 140. The ingestion system 100 is in communication with a user 120, which may include a user computing device and/or an individual user of the computing device, an object database 150, ingestion data 110, and one or more data sources 115. In this example, the ingestion system 100 is configured to interact with the user 120, such as via user interfaces identified by the user interaction component 130, to display portions of the ingestion data 110 to the user 120, such as documents that are received for ingestion into a data management system, and to enable the user to identify and/or confirm relationships of data items within the documents and data items in one or more external data sources 115.

In the example of FIG. 1, the user interaction component 130 may generate a user interface displaying a portion of a document that is marked for ingestion into a data management system, such as a text file, image file, or scanned document. For ease of explanation, much of the discussion herein refers to ingestion and tagging of documents, but any other type of data file (e.g., image file, spreadsheet file, presentation file, code file, etc.) can be used in place of a document in other implementations.

With at least some of a document displayed, the user 120 may identify a portion of the document of particular interest, and associate a tag with that portion of the document (e.g., the portion of the document is a data item that is associated with a tag). The expansion component 140 may then identified additional data sources 115 that may include additional information related to the tagged data item in the document. For example, the expansion component 140 may automatically identify keywords, images, patterns, etc. in the tagged data item and search for data sources that include information regarding those automatically identified keywords, images, patterns, etc. The user interaction component 130 may then update a user interface provided to the user 120 to include information regarding the identified data sources 115, such as a portion of the potentially relevant content at the one or more data sources 115. The user is then able to tag portions of those related data sources and associate the newly tagged data items with the tagged data item in the original document. Advantageously, object data 142 is associated with the tagged data item in the document and/or the document itself (e.g., to a document object associated with the document) and includes indications of other related tags within the document and related tags in other data sources. Thus, the object data 142 allows users to quickly and easily access tagged data items in multiple external data sources when the ingested document is later accessed.

FIG. 2 is a conceptual block diagram illustrating the object data 142, such as may be associated with a particular data item of an ingested document, and associations with multiple tags within the ingested document and multiple external documents. In this example, tag 144A is associated with a portion 203 of the original ingested document 202. Tag 144B is associated with a portion 205 of a document 204 that may have been displayed to the user automatically by ingestion system 100 as possibly including information relevant to the tagged data item 203. The user may have selected a particular portion 205 of document 204 to which the tag 144B is applied, or ingestion system 100 may have automatically identified the portion 205 of the document 204 as relevant to the tagged data item 203 of document 202. Similarly, tag 144N is associated with a larger portion 207 of a document 206, which may include a different type of information than document 204 and/or document 202, but which is also relevant to the original tagged data item 203 in the ingested document 202. Accordingly, the object data 142, which may be stored as an object in an ontology that includes associations with other data objects, allows immediate retrieval of data items related to a tagged data item or document.

FIG. 3 is an example user interface 300 illustrating a view of an ingested document that allows a user to create tags in the ingested document, as well as initiate lookup of potentially related documents and other information for creating related tags. In this example, a document 320 is illustrated in a document tagging window. The example document 320 is a compound overview document, which is generally a document that includes characteristics of a chemical compound for which additional related information may be accessible in other data sources. For example, the compound overview document may include information regarding impurities in the chemical compound, and other information regarding the same or similar impurities in the same or similar chemical compounds may be relevant to a reviewer of the document 320. In an example implementation, a compound overview document may require review by a compliance officer to determine if the level of impurities in the compound is acceptable. Thus, the impurities identified in a particular compound overview document may benefit from cross referencing with other information regarding the same impurities, such as other instances of compounds previously reviewed by the compliance officer with the same or similar impurity. As used herein, an impurity is generally a non-essential chemical at certain levels in a drug, which is usually created as a byproduct of the production process. Thus, determining how impurities were handled in other compound overview documents may be valuable information for the compliance officer (or other reviewer) to have.

With a portion of the document 320 displayed, the user can select portions of the document 320 to which tags should be applied. For example, the user has selected area 330 as a data item to be associated with a first tag 332. In this particular example, area 330 includes both text and graphical images associated with an impurity in the chemical compound. Depending on the implementation, tags may include any combination of information. Additionally, as discussed further below, certain types of graphical images may be automatically analyzed and interpreted to determine automatic selection of related data sources for display to the user. In the example of FIG. 3, data item 330 is associated with a tag 332 that is titled USP Impurity B, and includes an identified property type of "Impurity." Depending on the embodiment, tags may include various properties. In some embodiments, the tags are usable to automatically display the portion of the document 320 that includes the tagged data item. For example, if the document 320 is thousands of pages long and the tagged data item 330 is on page 155, while the user is browsing on page 900 of the document 320, selection of tag 332 would cause display of page 155 in the document 320.

FIG. 4A illustrates an extraction pane 400 that allows selection of related information to be associated with a tagged data item. For example, the extraction pane 400 may be displayed in response to selection of a portion of the document 320 for tagging. The interface 400 allows the user to create a data object (or "data item") of an Impurity type, to which multiple tags from multiple data sources may be associated. For example, a particular data item that is tagged may be related to other data items that have already been tagged with reference to the same type of data, such as the same impurity in the example of FIGS. 3 and 4. Thus, the user may want the new tag to be associated with other pre-existing tags, such as to create associations between the newly tagged data item and other data items in other documents that are also related to the same impurity. Alternatively, the user can create a new impurity data item to which the tag is associated.

FIG. 4B illustrates a user interface 450 that may be displayed for creation of a new data object for a tagged portion of a document. In this example, a form for data entry on a particular data type (e.g., an impurity data type in this example) is used. In some embodiments, use of a form provides a rigid format for data collection that may improve data consistency. For example, with use of data constraints of a form (and/or other similar user interface elements), extracted data objects may be generated and stored with minimal (or no) extra processing that may otherwise be needed to cleanse the user-provided data for downstream analytics or dashboards. For example, the particular types of properties and characteristics of those properties for a particular object (e.g., for an impurity data object) may be defined in a form to ensure that all data objects of that type have consistent data.

In this example, the system may automatically search additional data sources for information associated with the tagged information. As shown, the user interface 450 indicates that a new data object of a type "impurity" will be automatically linked to the compound overview source document 320 (labeled "CO22231" in this example). Additionally, the user can provide identification information associated with the newly created impurity data item. A Substance ID may automatically be generated for the new impurity, or the user may be allowed to provide or select a Substance ID. For example, in some embodiments the system may identify the Substance ID from another data source that is determined to be associated with the same impurity. For example, information regarding the tagged data item may be used to search for additional information regarding the tagged data item (e.g., an impurity) and to extract a Substance ID (or other type of identifier in other implementations) from the identified additional information. In some embodiments, fuzzy matching of properties associated with a data item may be used in the searching, such as to identify related information that uses a slightly different spelling for a tagged chemical compound. As another example, graphical information, such as a molecular structure of an impurity may be analyzed and used to identify additional data associated with that same molecular structure. In either case, the system provides an automated method of determining an identifier of a data item so that the data item may be even more easily associated with additional relevant data.

FIG. 4C illustrates a user interface 470 that may be displayed in response to user selection of an option to link a data item with another tagged data item. For example, after creation of the new impurity data object in the example of FIG. 4B, the user may wish to identify further information regarding the impurity from other sources. The user interface 470 allows the user to search for related information in various manners, such as using textual keyword searching and/or graphical image searching. In the example search shown in interface 470, a graphical search for the molecular structure included in the tagged data item 330 has been searched by the system. For example, the system may apply a molecular interpretation algorithm to determine the molecular structure identified in a graphical visualization of the compound, and then search one or more data sources for use of the same (or similar in some instances) molecular structure, whether mentioned by name, by a similar molecular structure visualization, or by an identifier associated with the substance. Thus, the system allows the user to have quick access to relevant information at the time when a data item in an ingested document data is tagged as relevant. In some embodiments, a substance corresponding to the graphical molecular structure is first determined, and then characteristics of the substance are used to identify other related information. For example, an alphanumeric ID of a substance identified based on a graphical molecular structure may be used to identify other information associated with that same substance ID, without the user needing to identify the substance ID. In the example of FIG. 4C, a specifications data source is searched for related information regarding the interpreted molecular structure, and potential matches are displayed for selection by the user. The user may select one or more of identified data items to cause creation of a link in the impurity data item to the source document, and more particularly to a portion of the source document including the displayed potential match information, from which the potential match information was obtained.

FIG. 5 is an example user interface 500 that may be displayed to allow the user to cycle through tags associated with an ingested document and with the corresponding tagged data items within the ingested document and/or other source documents. In this example, tags pointing to two source documents are displayed. In particular, tag 520 indicates that the tag is associated with a Specifications document. The tag 520 may have been associated with the new impurity data item in response to the user selecting button 472 in the example user interface 470 to cause linkage of that data item from an external specifications document with the newly created impurity data item to which the tag 330 has also been associated. Thus, the information from both the external specifications document, as well as the information identified in the source document 320 (e.g., the Compound Overview Document) are each associated with a common data item.

In this example, tag 520 has been selected by a user, such that the portion of the specifications document associated with the tag 520 is displayed. Information included in the tagged portion of the specifications document has also been extracted and placed in the tag 520. Additionally, user interface 500 indicates that tag 510 is associated with the original ingested document 320 (e.g., the Compound Overview Document), and includes properties associated with the data. As shown in FIG. 5, the system advantageously stores a history of changes made to data items associated with the ingested document. For example, the user interface 500 illustrates that Bob Jones created a tag to the Compound Overview Document four minutes ago, and then created a link to the Specifications document one minute ago.

Figure 6:
FIG. 6 is an example user interface that displays information regarding an ingested document.

FIG. 6 is an example user interface 600 that displays information regarding an ingested document. In the example of FIG. 6, the user interface 600 illustrates a Compound Overview that shows information regarding a particular chemical compound associated with a unique ID CO22231. A menu 610 of the user interface 600 provides options for display of an overview of the compound, impurities, related products, and related documents. In the example view of interface 600, an Impurities tab is selected, such that the windows 620, 630, 640 each include information related to impurities associated with the compound, such as may have been identified in a Compound Overview Document and/or one or other external documents in one or more other data sources. In this example, a Specifications document and a Known Issues document that are each associated with the Compound Overview (e.g., the original ingested document) include related tags. With the Known Issues document selected in window 620, a Known Issues window 630 is displayed, and includes information regarding tags associated with known issues, such as impurities, and/or other known issues. In this example, a notes window 440 allows users to provide notes, such as analysis, conclusions, action items, etc. related to the particular compound.

Figure 7:
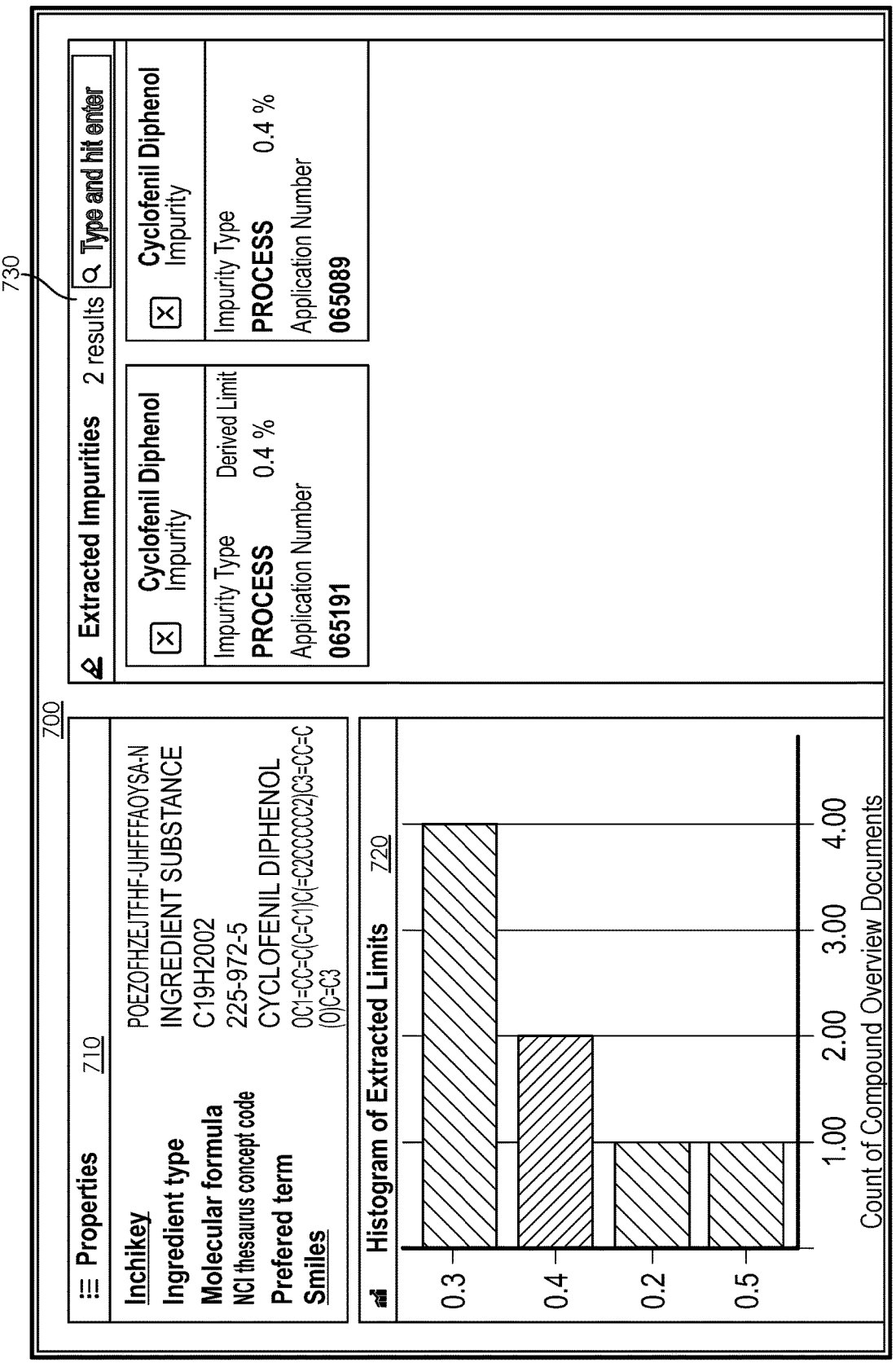
FIG. 7 is an example user interface illustrating a dashboard view of information related to a particular data item (e.g., an impurity data item in the illustrated example).

FIG. 7 is an example user interface 700 illustrating a dashboard view of information related to a particular data item (e.g., an impurity data item in the illustrated example). The user interface 700 may be accessed, for example, by another user after ingestion of the document, and establishment of links to related information, is performed. In the example of FIG. 7 the dashboard view includes information from multiple linked documents, including a properties window 710 that includes various properties of an impurity data item, a visualization window 720 that includes a histogram of extracted limits of the selected impurity (e.g., from multiple source documents), and a tag window 730 that includes overviews of tags that are associated with a particular impurity data item. The dashboard view may be customized to include additional or less information, such as based on the particular implementation and/or based on the particular user. For example, users that are viewing the same data may select different dashboard arrangements that suit their needs best. Thus, different visualizations (e.g., charts, graphs, timelines, heat maps, etc.) may be included in dashboards. Dashboards and/or other data analytics may be generated with lower computing and human resources because of use of consistent user-provided data in data objects, which may be achieved through use of structured forms, as discussed above.

In some embodiments, elements of a dashboard (and/or other display interface) may be automatically selected and generated, such as based on form elements used to acquire data from users. For example, for an impurity data object, the system may be configured to create an associated "Impurity type" String property, with possible values of "Degradent", "Process", or "Degradent and Process." Form elements may be automatically selected and/or generated based on values of form elements. In some implementations, an Ontology may use a more expressive type system, such as to support enumerated types that constrains values of a property type, so that those constraints may be enforced in the Ontology property type itself and used to automatically generate a corresponding form element (e.g., in a dashboard or other visualization).

Figure 8:
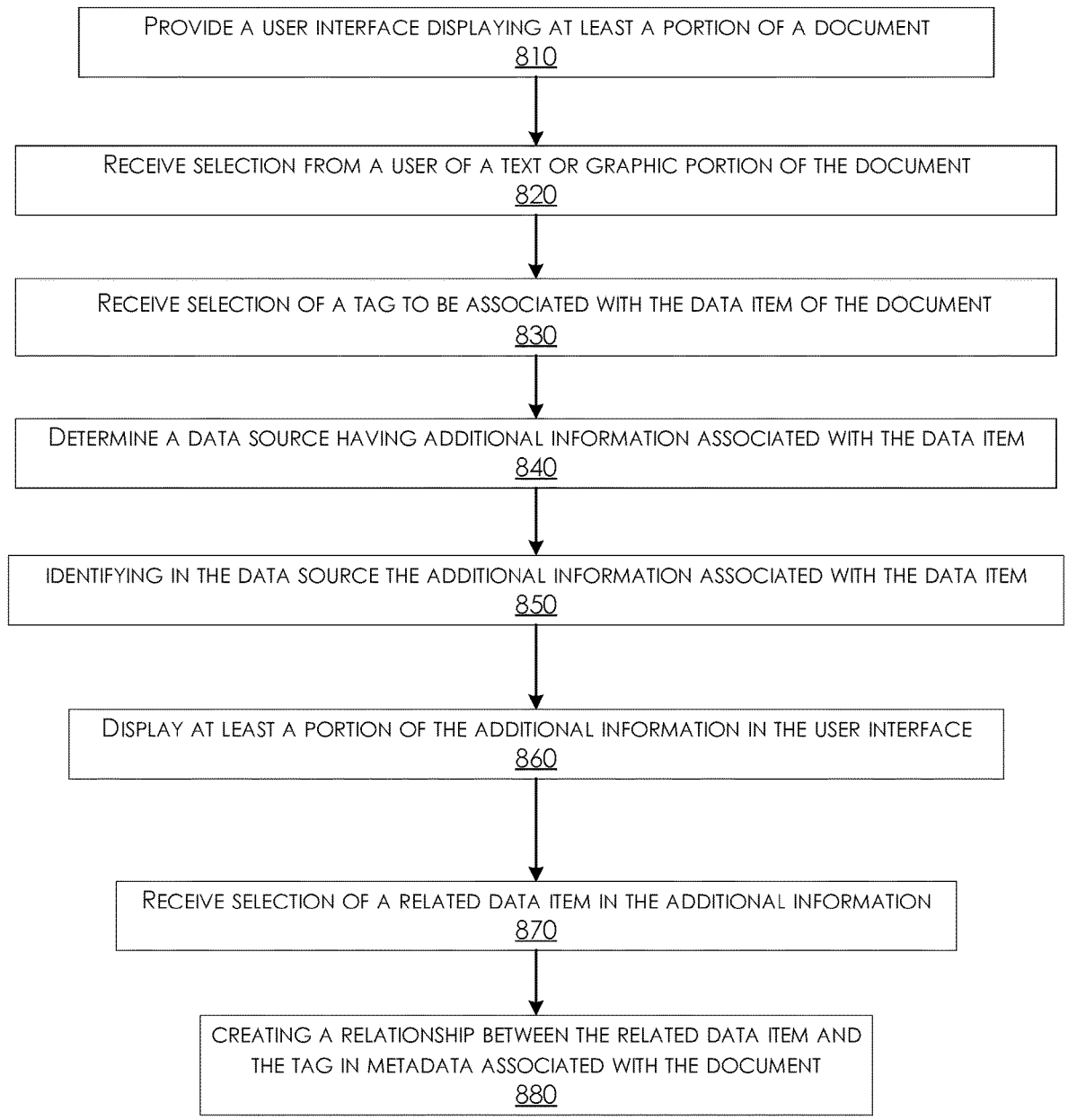
FIG. 8 is a flowchart illustrating one embodiment of a method that may be performed by the ingestion system and/or another computing system.

FIG. 8 is a flowchart illustrating one embodiment of a method that may be performed by the ingestion system 100 and/or another computing system. Depending on the embodiment, the method of FIG. 8 may include fewer or additional blocks and the blocks may be performed in an order that is different than illustrated.

Beginning in block 810, the system provides a user interface displaying at least a portion of a document. For example, the ingestion system may generate user interface data configured for display on the user device 120. A viewing software application may execute on the user device 120, either as a local application, in a browser, or some combination of a local and browser-executable software. In some embodiments, the ingestion system 100 receives ingestion data 110 for an external data source. For example, an entity may provide access to a large database of documents for the ingestion system 100 to analyze, tag, and record in an ontology of data items. The ingestion system 100 may automatically ingest documents as they become available at a data source and/or may ingest documents on demand. For purposes of illustration, the ingestion system is discussed in this example with reference to ingestion of a particular document. For example, documents that are ingested into a data management system may include various types of information, such as various graphic elements (e.g., photographs, charts, tables, logos, drawing elements, handwriting, scanned text), as well as computer readable content, such as text, markup code, hyperlinks, fields, etc. In many document ingestion implementations, early identification of associations between documents that have some overlapping content reduces both human and computer resources as the information is later accessed, potentially in multiple instances by multiples users. For example, a document may include information regarding a particular item, such as a particular automobile, grocery store, sporting equipment, microorganism, chemical substance, etc. for which additional information is available in one or more other data sources. For example, when a document describing maintenance work performed on a particular automobile is ingested into a data management system (for example, an invoice for maintenance work is scanned and stored in a document management system), identifying related data items and including those in metadata associated with the document (e.g., as links to tags in those other documents) advantageously conserves computer processing requirements when users later access the maintenance work document, relieving the computer the later task of attempting to identify the related data items (perhaps multiple times for multiple users). Thus, as described herein, a document ingestion system allows a user, such as a user that manages ingestion of a certain type of documents for an organization, to easily identify related data items and to establish associations with related data items.

Moving to block 820, the user selects a portion of the document to include in a data item. For example, the user may select a textual portion of the document to be tagged as an object of a particular type, such as a person, event, transaction, etc. Similarly, the user may select a graphical area, such as a particular graphical image in the document or an undefined area of the document that may include any type of data, such as a rectangular area that includes text and/or graphics.

At block 830, a tag to be associated with the selected portion of the document is selected. For example, the user may select one or more properties of the tagged data item, such as to identify properties that are included in the tagged area of the document, provide an explanation of the tagged content, or provide other information related to the tagged data item. Thus, the system may access these identified data sources to locate information of particular types that are potentially relevant to the tagged data item. In some embodiments, properties of the tagged data item are automatically determined by the system, such as through parsing of information in the tagged portion of the document.

Continuing to block 840, the system determines a data source having information that is potentially relevant to the tagged data item. In some implementations, a set of data types and/or data sources are identified as having potentially relevant information to each of a set of ingested documents. For example, if the set of ingested documents are automobile work orders, the system may be configured to identify potentially relevant documents in a first data sources having automobile manufacturer specifications, another data source having automobile recall information, one or more databases having information regarding particular repair procedures, and the like. In some embodiments, the system accesses databases that are not necessarily on a list of relevant data sources in search of information related to the tagged data item. For example, the system may search one or more databases for use of keywords that are included in the tagged data item (and/or are determined to be related to content in the tagged data item).

In block 850, the identified data sources are searched for potentially relevant information. When potentially relevant information is located, at least a portion of the information is displayed to the user in block 860. For example, a specification document regarding a chemical compound that is tagged in an ingested document may be displayed in the user interface. In another example, upon scanning an automobile maintenance work order, the document ingestion system may automatically identify a particular make and model of automobile identified in the work order and search for external data sources regarding that make and model of automobile. Similarly, the document ingestion system may automatically identify a repair procedure performed on an automobile and automatically search for external data sources that may include information regarding that specific repair procedure. In some embodiments, a portion of the displayed document that includes the potentially relevant information is displayed in the user interface.

Moving to block 870, the user selects a portion of the related document to tag and associate with the data item tagged in the originally ingested document. For example, the user may select a graphical or text portion of the related document to be associated with the tagged content of the ingested document. Accordingly, in the example of a work order document, information from these additional data sources may be displayed, such as in a side-by-side view with a portion of the work order document, so that the ingestion specialist can select relevant portions of those data sources to be associated with the document.

At block 880, the system creates a relationship between the selected data item and the tagged data item, which may be stored in metadata associated with the ingested document and/or the tagged data items. Thus, when a user later access a tagged data item, relationships with related tagged data items, including source documents of the related data items, is provided to the user. Accordingly, when a user later accesses that automobile work order, the relationships with the external data sources is identified by the system and the tagged portions of those data sources may automatically displayed to the user.

Alerts and Notification

In some embodiments, the ingestion system 100 may provide alerts and/or other notifications to entities having an interest in ingestion and/or tagging of documents. For example, an alert may provide a real-time notice to an analyst (e.g., via user device 120 of FIG. 1) that a document with information on a topic of interest has been ingested and data items in the document have been associated with external data sources. In some embodiments, alerts may be automatically transmitted to the device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Example Computing System Architecture and Operation

Figure 9:
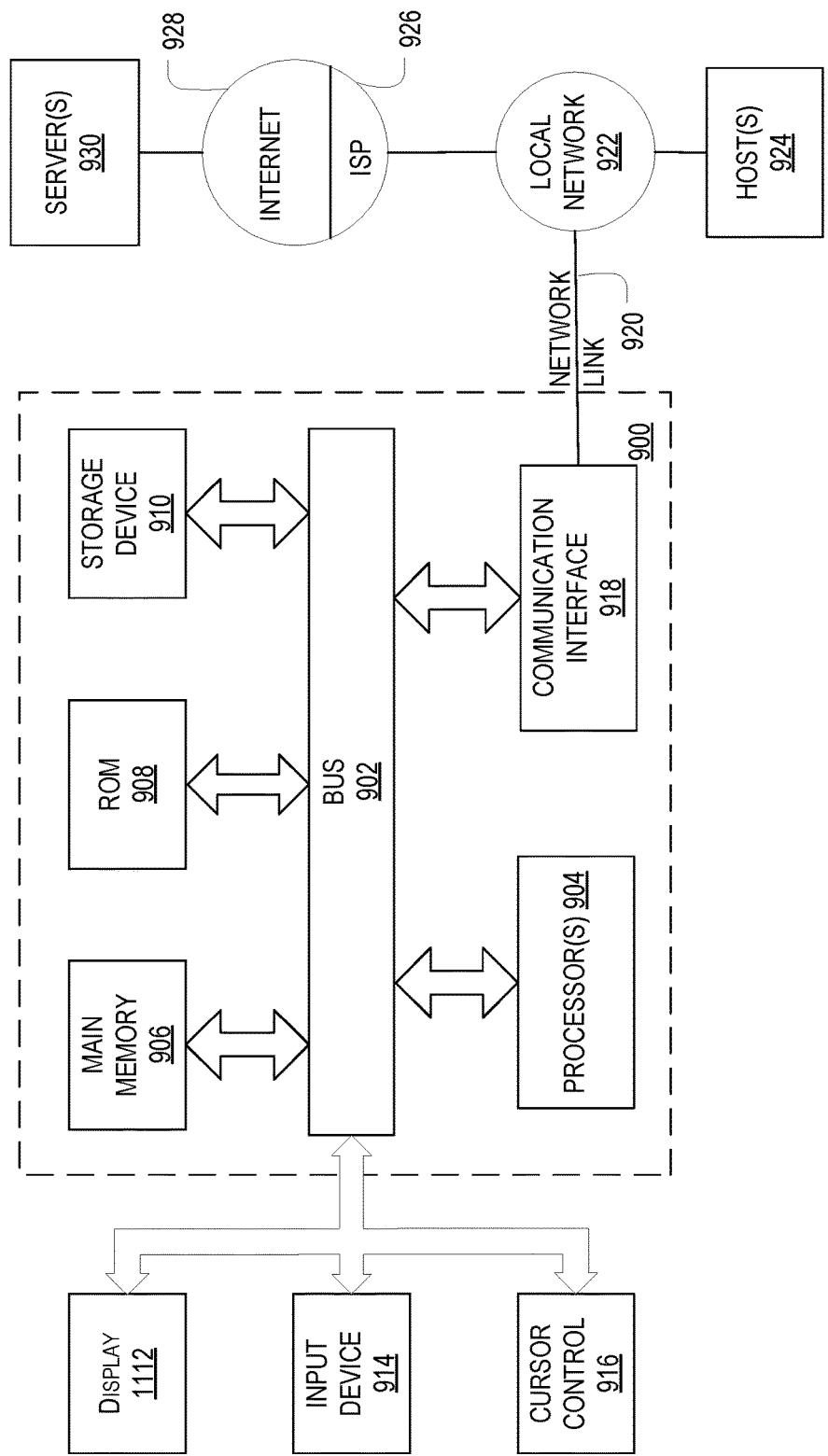
FIG. 9 illustrates an example computer system with which certain methods discussed herein may be implemented.

FIG. 9 illustrates a computer system 900 with which certain methods discussed herein may be implemented. For example, the tagging system 110 and/or the user device 120 may include some, all, or additional components as discussed below with reference to system 900.

Computer system 900 includes a bus 902 or other communication mechanism for communicating information, and a hardware processor, or multiple processors 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 106, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method, performed by a computing system having one or more hardware computer processors and one or more non-transitory computer readable storage device storing software instructions executable by the computing system to perform the computerized method comprising:
providing a user interface displaying at least a portion of a document;
receiving, from a user, selection of a data item within the portion of the document;
receiving user input indicating a tag to be associated with the data item;
determining a type of the data item;
automatically determining a data source having additional information associated with the determined type of data item;

initiating identification of one or more additional data items associated with the determined type of data item in the data source;

displaying indications of the one or more additional data items in the user interface;

receiving selection of a first additional data item of the one or more additional data items;

creating a second tag identifying the data source; and creating or updating an object data item associated with the document, the object data item indicating at least:
- the tag associated with the data item of the document; and
- the second tag identifying the data source of the first additional data item.

2. The computerized method of claim 1, wherein the additional information is of the same determined type of data item.

3. The computerized method of claim 1, wherein the additional data item includes a selectable link to the data source.

4. The computerized method of claim 3, wherein selection of the selectable link causes the user interface to be updated with at least a portion of the additional information from the data source.

5. The computerized method of claim 1, wherein the user interface is configured to concurrently displays at least a portion of the document, the data item associated with the tag, and the first additional data item associated with the second tag.

6. The computerized method of claim 1, further comprising:
receiving from the user an indication of one or more properties of the data item, wherein said determining the data source having additional information associated with the data item is based at least partly on the one or more properties of the data item.

7. The computerized method of claim 6, wherein the one or more properties of the data item include one or more of a name, an identifier, or characteristic of the data item.

8. The computerized method of claim 1, wherein the object data item includes indications of when the data item was tagged and when the first additional data item was tagged.

9. A computing system comprising:
a hardware computer processor;
a non-transitory computer readable medium having software instructions stored thereon, the software instructions executable by the hardware computer processor to cause the computing system to perform operations comprising:

providing a user interface displaying at least a portion of a document;

receiving, from a user, selection of a data item within the portion of the document;

receiving user input indicating a tag to be associated with the data item;

determining a type of the data item;

automatically determining a data source having additional information associated with the determined type of data item;

initiating identification of one or more additional data items associated with the determined type of data item in the data source;

displaying indications of the one or more additional data items in the user interface;

receiving selection of a first additional data item of the one or more additional data items;

creating a second tag identifying the data source; and creating or updating an object data item associated with the document, the object data item indicating at least:
- the tag associated with the data item of the document; and
- the second tag identifying the data source of the first additional data item.

10. The computing system of claim 9, wherein the additional information is of the same determined type of data item.

11. The computing system of claim 9, wherein the additional data item includes a selectable link to the data source.

12. The computing system of claim 11, wherein selection of the selectable link causes the user interface to be updated with at least a portion of the additional information from the data source.

13. The computing system of claim 9, wherein the user interface is configured to concurrently displays at least a portion of the document, the data item associated with the tag, and the first additional data item associated with the second tag.

14. The computing system of claim 9, further comprising:
receiving from the user an indication of one or more properties of the data item, wherein said determining the data source having additional information associated with the data item is based at least partly on the one or more properties of the data item.

15. The computing system of claim 14, wherein the one or more properties of the data item include one or more of a name, an identifier, or characteristic of the data item.

16. The computing system of claim 9, wherein the object data item includes indications of when the data item was tagged and when the first additional data item was tagged.

* * * * *

UNITED STATES PATENT AND TRADEMARK OFFICE
CERTIFICATE OF CORRECTION

PATENT NO. : 11,429,598 B2
APPLICATION NO. : 17/234420
DATED : August 30, 2022
INVENTOR(S) : Daniel Slomka It is certified that error appears in the above-identified patent and that said Letters Patent is hereby corrected as shown below:

In the Claims

Column 21, Line 17 (approx.), Claim 2, after "the" delete "same".

Column 21, Line 27 (approx.), Claim 5, after "interface" delete "is configured to".

Column 22, Line 25 (approx.), Claim 10, after "the" delete "same".

Column 22, Line 34 (approx.), Claim 13, after "interface" delete "is configured to".

Signed and Sealed this
Seventh Day of February, 2023

Katherine Kelly Vidal
*Director of the United States Patent and Trademark Office*